United States Patent [19]

Makhlouf

[11] Patent Number: 5,107,729
[45] Date of Patent: Apr. 28, 1992

[54] MASTER TOOL

[76] Inventor: Samir B. Makhlouf, 723 Creek Trail, Kennesaw, Ga. 30144

[21] Appl. No.: 658,828

[22] Filed: Feb. 22, 1991

[51] Int. Cl.⁵ .............................................. B25B 17/00
[52] U.S. Cl. .................................... 81/57.3; 81/57.14
[58] Field of Search ................ 81/57.12, 57.13, 57.14, 81/57.28, 57.29, 57.3, 57.45, 57.46, 58.2

[56] References Cited

U.S. PATENT DOCUMENTS

| | | | |
|---|---|---|---|
| 1,420,635 | 6/1922 | Klopper | 81/57.3 |
| 1,487,785 | 3/1924 | Knowles | 81/57.3 |
| 1,489,908 | 4/1924 | Tanner | 81/57.3 |
| 1,875,529 | 9/1932 | Vandervoort | 81/57.3 |
| 3,630,106 | 12/1971 | Olinger | 81/57.29 |
| 4,254,674 | 3/1981 | Strussion et al. | 81/57.3 |
| 4,506,567 | 3/1985 | Makhlouf . | |

FOREIGN PATENT DOCUMENTS 247130  6/1969  U.S.S.R. ................ 81/57.3

Primary Examiner—James G. Smith
Attorney, Agent, or Firm—Leonard Belkin

[57] ABSTRACT

A torque multiplying wrench having a jaw at one end and an adaptor at the other end for receiving torque input. The wrench employs a rotatable shaft extending the length of the wrench with bevel gears at the proximate end to engage the input adaptor and a bevel gear arrangement at the distal end to transfer torque from the shaft to the jaw which is toothed. The bevel gear arrangement at the distal end of the wrench employs a pair of shafts engaged at one end to said rotatable shaft through bevel gears. The shafts fan out to opposite sides of the jaw and employ worm gears to transmit the output torque to the jaw. The worm gears are especially designed to increase the number of teeth engaged with the jaw in order to reduce the load on individual teeth.

16 Claims, 6 Drawing Sheets

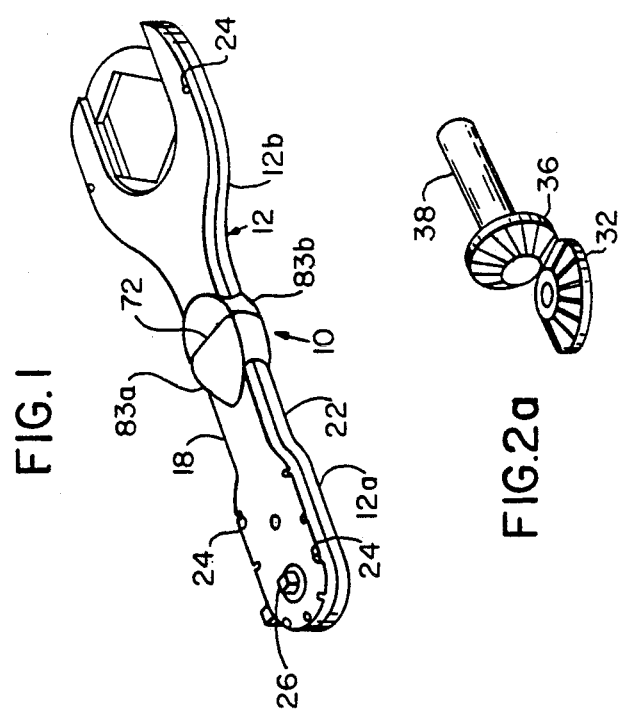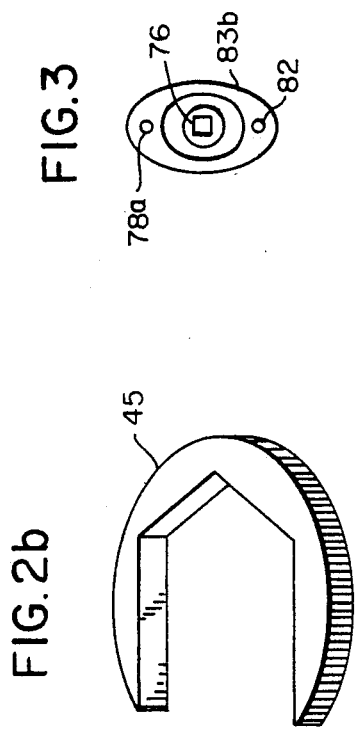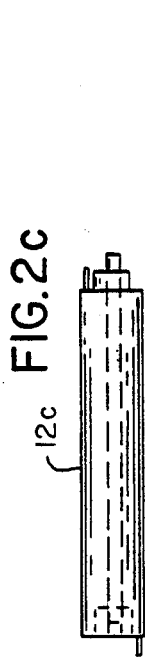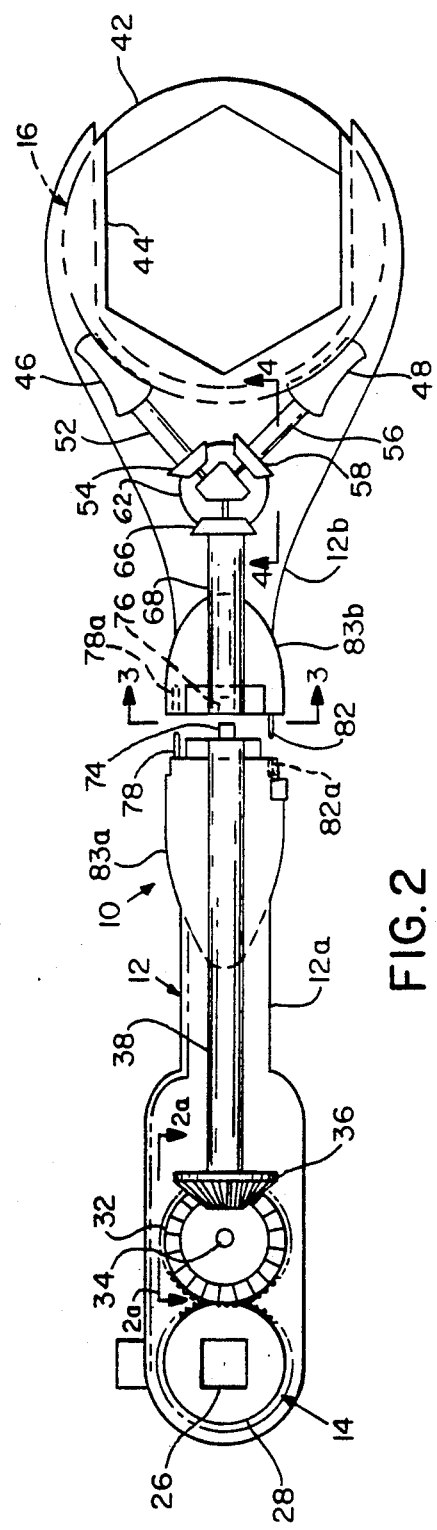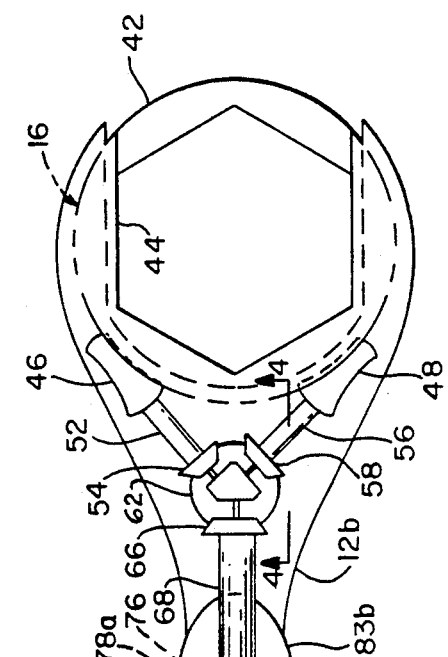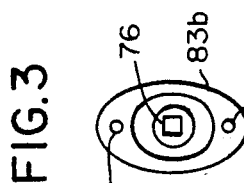

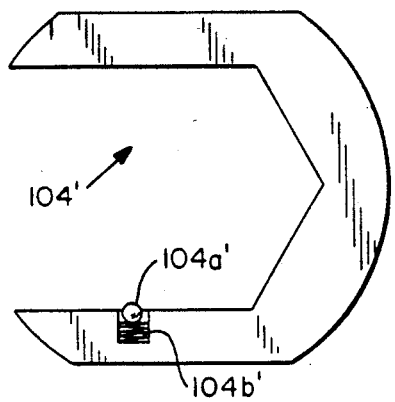
FIG. 7a
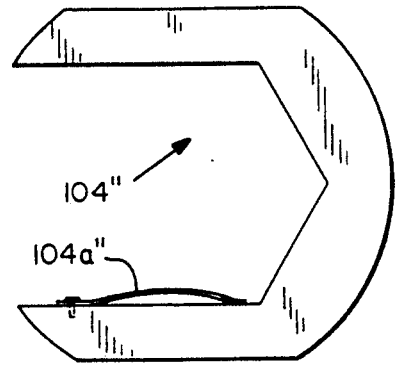
FIG. 7b
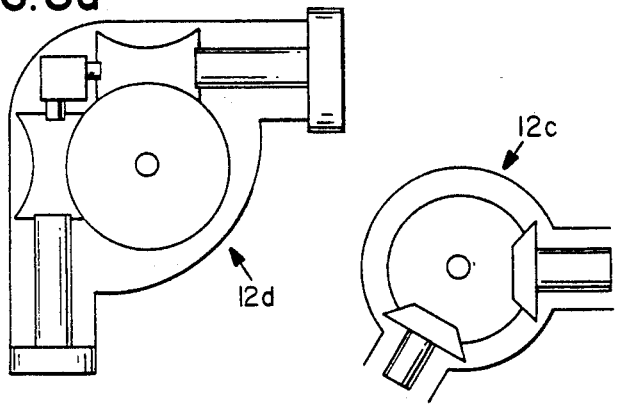
FIG. 8a
FIG. 8b
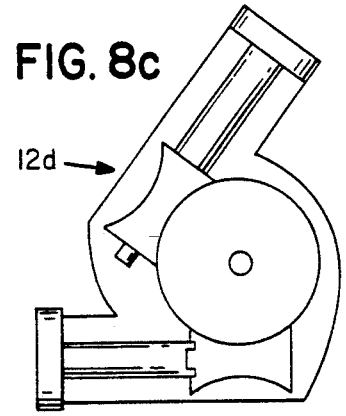
FIG. 8c
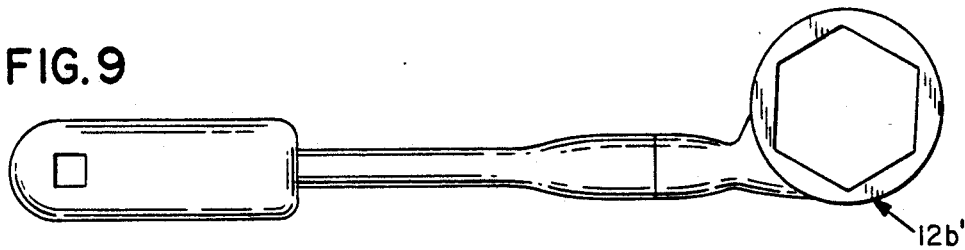
FIG. 9
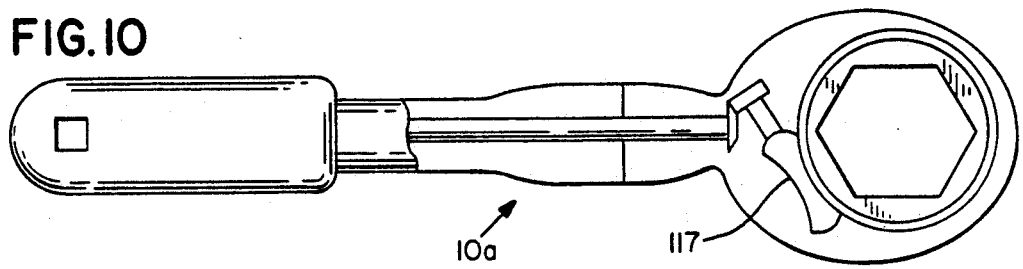
FIG. 10

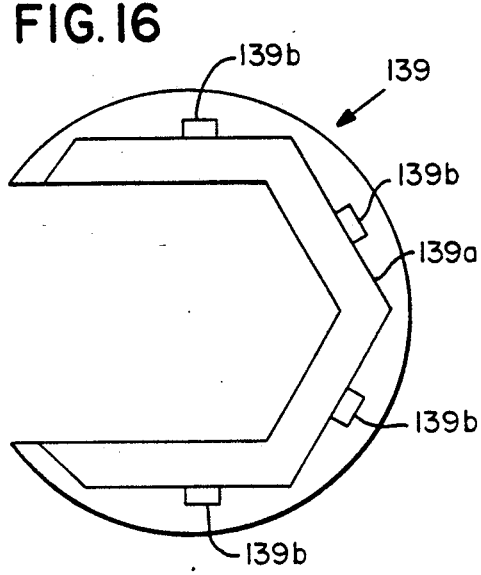
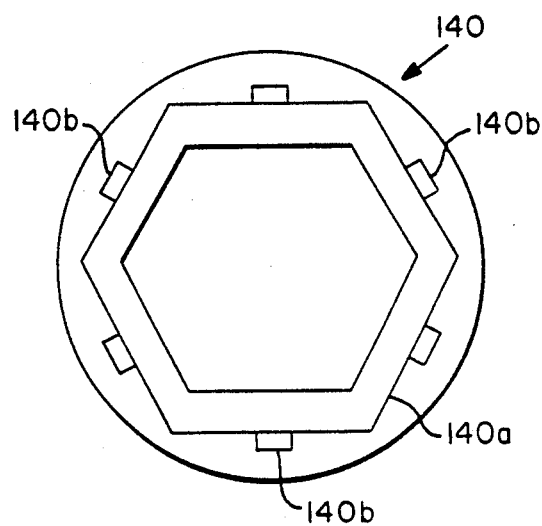
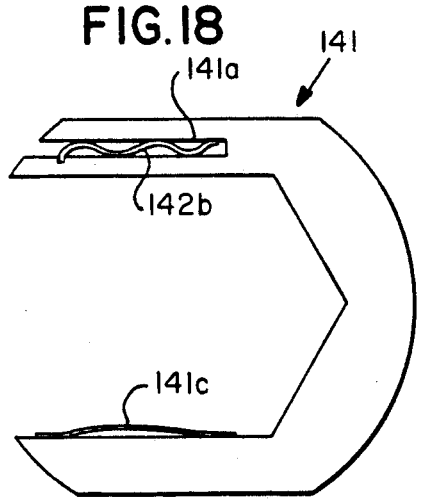
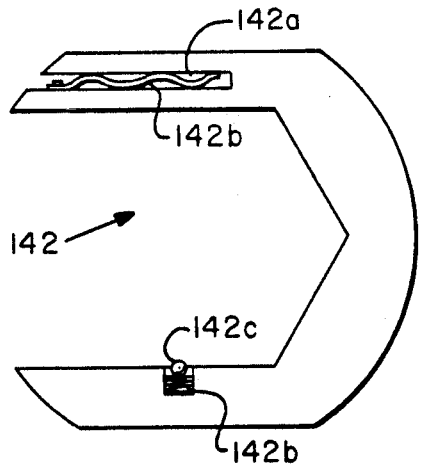

MASTER TOOL

BACKGROUND OF THE INVENTION

This invention relates to a master tool and more particularly to a torque multiplying wrench small enough to be hand held and capable of providing large increases in torque with minimum effort by the user.

Many presently available wrenches for providing high torque lack the ability to induce turning force in the plane of the nut or bolt. Furthermore, many of them suffer from one or more major limitations such as being very heavy and requiring bulky stabilizing reaction arms. Another drawback of existing torque multipliers is their relatively high cost and in many cases the need to have more than one person apply the tool.

Furthermore, new bolting technology is rapidly replacing riveting and welding methods in a variety of construction and engineering industries. Although the evolution of this technology has been rapid, the corresponding development of supporting tools has lagged far behind.

In my U.S. Pat. No. 4,506,567 issued on Mar. 26, 1985 I show a maximum capability wrench which was designed as a hand tool for mechanics, hobbyists, "do-it-yourselfers", and others, to remove, for example a stubborn nut, or to reach in places where the work to be performed does not permit rotation of the wrench itself. While the patented tool has proven to be useful under the particular set of circumstances described, it has turned out not to be adequate for the major applications described above. For these applications, the use of the chain drive produces an inadequate amount of torque multiplication. In addition, no provision is made to deal with the large reaction forces. Also, the patented tool does not permit repairs to be readily made by the user, a feature which might not be important for a small, inexpensive tool useful for relatively light applications. For the kinds of applications concerned about herein, the ability to make repairs in the field is an important advantage.

In my U.S. Pat. No. 4,928,558 issued on May 29, 1990, the problems associated with devices in use up to now for torque multiplication are largely overcome in a tool small and light enough to be hand held.

However, one of the concerns which appears in connection with the use of such a small tool capable of producing such large torque multiplication is the ability of the materials employed to transfer such large loads without excessive wear or outright failure in such circumstances.

SUMMARY OF THE INVENTION

In this invention, improvements have been made to permit larger torques and greater torque ratios to be accommodated in a hand held wrench with fewer parts than is possible in the invention described and claimed in the 558 patent while at the same time spreading the load at the end of the wrench to reduce the risk of failure of any of the parts.

In accordance with a preferred embodiment of this invention there is provided a hand held, torque mulitiplying wrench employing concave profiled or hour glass type helical gears in a configuration which makes it possible to produce higher torque loads in a given wrench size and to disassemble the wrench for convenient storage and transportation, while permitting the length of the wrench or the shape of the wrench to be conveniently varied so as to be used in more hard to reach locations than has been heretofor possible. For a given torque ratio, the wrench incorporating the principles of this invention has fewer parts than previously thought to be possible.

It is thus a principal object of this invention to provide a hand held, torque multiplying wrench with increased torque carrying capacity and improved transportability.

Other objects and advantages of this invention will hereinafter become obvious from the following description of preferred embodiments of this invention.

BRIEF DESCRIPTION OF THE DRAWINGS

FIG. 1 is an isometric view of a preferred embodiment of this invention.

FIG. 2 is a schematic illustration, in plan view, partially exploded and cut away, of the embodiment shown in FIG1. 1.

FIG. 2a is a view along 2a—2a of FIG. 2.

FIG. 2b is an isometric view of an open jaw which may be employed instead of the closed jaw shown in FIGS. 1 and 2.

FIG. 2c is a plan view of an extension.

FIG. 3 is a view along 3—3 of FIG. 2.

FIGS. 7a and 7b show plan views of alternative jaw insert constructions.

FIGS. 8a, 8b, and 8c show in schematic form angled extension units which can be used under circumstances when the straight extension shown in FIG. 2c is not suitable.

FIG. 9 shows in schematic form how a replaceable head may be employed to permit the wrench to be used in an otherwise inaccessible location.

FIG. 10 shows in schematic form an alternative construction for the head of the wrench.

FIG. 16 is a top view of the jaw insert shown in FIG. 15.

FIG. 17 is a top view of a closed ended jaw insert which would be used with the jaw shown in FIG. 14.

FIG. 18 shows a plan view of a jaw insert incorporating an anti fatigue/windup mechanism and a spring to prevent accidental release from the jaw FIG. 19 shows a plan view of a jaw insert similar to that of FIG. 18 with a ball/spring mechanism instead of the spring.

DESCRIPTION OF THE PREFERRED EMBODIMENTS

Figure 4:
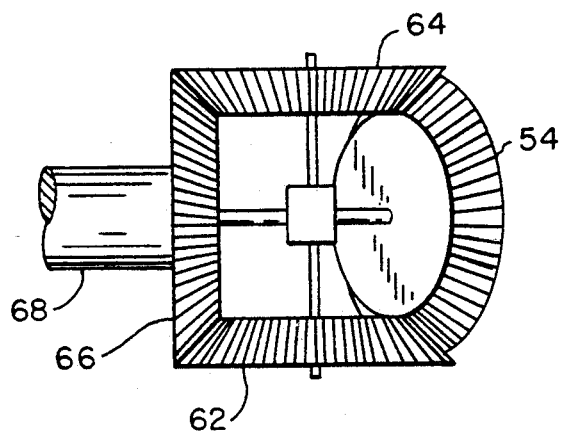
FIG. 4 is a view along 4—4 of FIG. 2.

Referring to FIGS. 1-4, wrench 10 consists of a elongated housing 12 containing at the proximal end the input drive assembly 14 and at the distal end the output drive assembly 16.

Housing 12 consists of an upper portion 18 and a lower portion 22 held together by a number of screws 24. Wrench 10 is made in sections which will be described later.

Input drive assembly 14 consists of a male drive member 26 passing through an opening in housing 12 and mounted on a gear 28 within housing 12. Gear 28 is engaged with the outer teeth of a bevel gear 32 mounted on a shaft 34. The bevel teeth of gear 32 are engaged with a bevel gear 36 mounted on and driving a shaft 38, as also seen in FIG. 2a.

Output drive assembly 16 consists of a toothed closed jaw 42 mounted in the jaw opening 44 of housing 12. If desired, an open jaw 45 as shown in FIG. 2b may be utilized.

Figure 5:
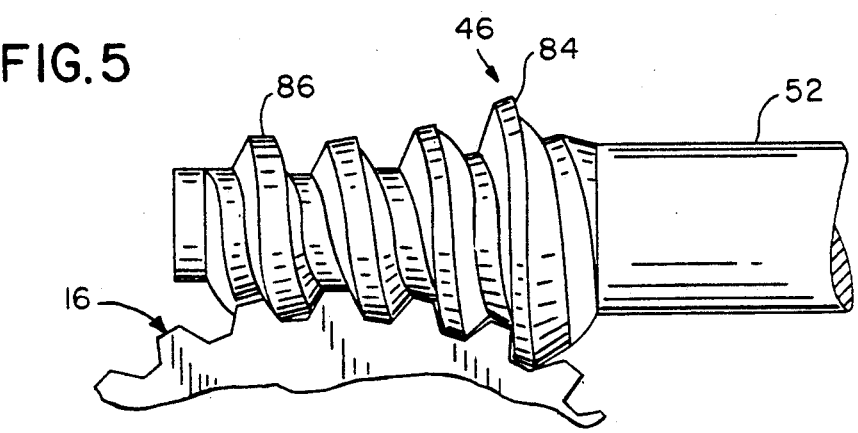
FIG. 5 is a detail of an hour glass worm gear engaging the jaw.

Engaged with jaw 42 within housing 12 are a pair of so-called hour glass helical worm gears 46 and 48 engaged in symmetrical fashion with the gear teeth on the outside of jaw 42, as seen also in FIG. 5.

Worm gear 46 is mounted on one end of a shaft 52 on the other end of which is mounted a bevel gear 54. Worm gear 48 is mounted on one end of a shaft 56 the other end of which is mounted a bevel gear 58. Both bevel gears 54 and 58 are engaged with and driven by bevel gears 62 and 64, as also seen in FIG. 4. Bevel gears 62 and 64 are driven by a bevel gear 66 which is mounted on one end of a shaft 68.

It will be noted that housing 12 is divided at 72 into parts 12a and 12b and that shafts 38 and with each other. The free end of shaft 38 is provided with a square male member 74 while the free end of shaft 68 is provided with a female square receptacle or socket 76 to receive male member 74 so that when the two parts 12a and 12b of housing 12 are connected together as shown in FIG. 1, shaft 38 when driven in the manner to be described, will drive shaft 68. The two ends of housing 12 at 72 are provided with prongs 78 and 82, and receptacles 78a and 82a to receive the prongs to maintain both parts 12a and 12b of housing 12 in alignment when in use. Spring loaded snaps (not shown) as understood in the art may be employed to keep both parts of housing 12 together when in normal use, but at the same time rendering it easy to pull the parts apart. Plastic or rubber coverings 83a and 83b may be utilized for convenience of handling.

In the arrangement just described, it can be seen that extensions such as extension 12c shown in FIG. 2c may be inserted between parts 12a and 12b of housing 12 to extend the reach of wrench 10, and also to take the wrench apart for ease of storage and transportability.

Helical worm gears 46 and 48 are designed with a annular concave profile to increase the number of teeth which are engaged at any one time with the gear teeth on jaw 42. The normal or usual worm gear with a straight profile usually involves two teeth in engagement at any one time. With an annular, concave profile, the so-called hour glass configuration, as seen in FIGS. 2 and 5, it is possible to at least double the number of teeth engaged between the two gears. In view of the fact that very high torques are capable of being delivered by the present invention, the use of at least two worm gears (46 and 48) to deliver the final torque output to jaw 42, and the doubling of the number of teeth through which the torque is transmitted to jaw 42, it is possible to sustain such large loads without the necessity of increasing the size of the components, and thus the size of wrench 10, to where it becomes unmanageable by a single person.

It will be seen from FIG. 5 as well as FIG. 2 that helical worm gear 46 is designed to have the largest tooth 84 closest to shaft 52 whereas the tooth 86 farthest from shaft 52 is significantly smaller in diameter. The reason for this configuration is to keep the distal end of wrench 10 surrounding jaw 42 as small in diameter as is possible. It is seen from FIG. 2 that enlarging the distal tooth on each gear 46 and 48 would cause the size of wrench 10 at this end to be enlarged, something to be avoided or minimized in a wrench designed to be small and light enough to be hand held while at the same time being capable of producing large torques at the output end In addition, it has been found that end teeth 84 and 86 should be slightly thicker than the remaining teeth because these teeth tend to bear a larger proportion of the load.

Figure 6:
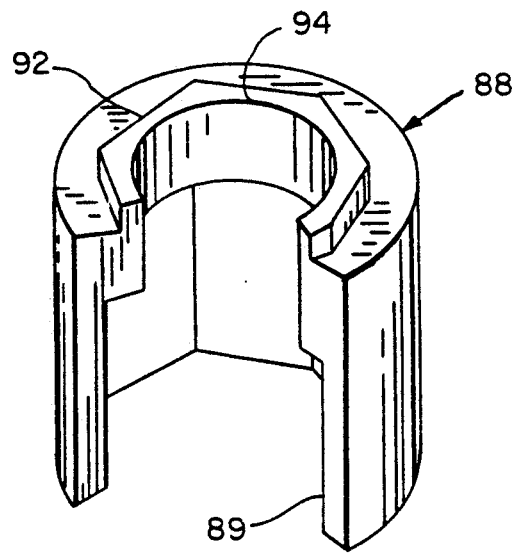
FIG. 6 is an isometric view of a socket adaptor which can be used with the wrench.

In order to be able to adapt jaw 42 or 45 for use with any size nut, the socket adaptor 88 shown in FIG. 6 would be employed. Adaptor 88 is provided with a socket 89 on the underside while on the top it is provided with a male nut head 92 with opening 94 passing all the way through adaptor 88, so that the bolt on which the nut to be turned can pass all the way through if need be. Male nut head 92 fits into the opening of jaw 42 and 45, and a variety of adaptors 88 would be provided with properly sized nut sockets on the underside to accomodate any size nut to be engaged. Adaptor 88 may be split as illustrated so that it can be placed over a bolt whose ends are not accessible to engage a nut on the bolt.

The gear ratios selected for wrench 10 are designed to obtain a maximum torque multiplication, that is, to maximize the multiplication of the torque applied to male input member 26 and the proximate end of wrench 10.

In the use of wrench 10, it would come disassembled, with parts 12a and 12b, separately stored in a case or carried. They would be mated together as shown in FIG. 2, and jaw 42 or 45 placed on the nut to be rotated A conventional socket wrench (not shown) would then be employed to engage male member 26 on the proximate end of wrench 10 and cause its rotation. A much higher torque is then transmitted to jaw 42 or 45 and socket adaptor 88 than can be obtained by the socket wrench engaged with male member 26.

Figure 7:
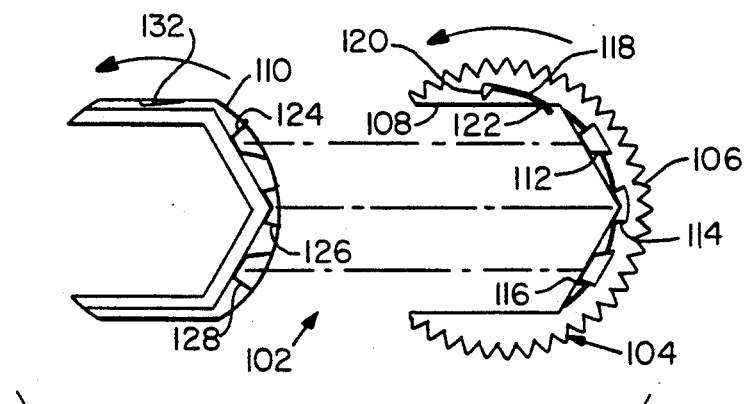
FIG. 7 is an exploded plan view of a modified jaw construction.

To improve the strength of jaw 45 shown in FIG. 2b, the arrangement illustrated in FIG. 7 may be employed. Jaw assembly 102 consists of a jaw 104 (to replace jaw 42) with teeth 106 on the outside to be driven by a helical gear as described in connection with FIGS. 1-6, with a mouth 108 to accomodate jaw insert 110. The inside of jaw 104 is provided with protruding embedded segments 112, 114 and 116 protruding as illustrated and a hook member 118 with a hook 120 pivoted at 122.

Jaw insert 110 is provided on the outside with cavities 124, 126, and 128 to accomodate protruding segments 112, 114, and 116, respectively. An additional slot 132 is provided to accomodate hook 120. When insert 110 is urged into opening 108 of jaw 104, hook member 118 will be pivoted clockwise so that hook 120 will drop into slot 132 to prevent insert 110 from dropping out by gravity. Insert 110 can readily be removed by hand.

This construction enhances the strength of the jaw of the tool and reduces flexing which could break or jam the tool. Segments 112, 114 and 116 help to distribute the load which ordinarily tends to be concentrated at the ends of each straight surface.

Other arrangements for insuring that the nut will not fall out of the jaw insert in situations where operators are working in tight areas or with greasy hands are shown in FIGS. 7a and 7b. In FIG. 7a, jaw 104' is provided with a ball 104a' and a spring 104b' for this purpose. In FIG. 7b, jaw 104" is provided with a spring 104a" mounted at one end for this purpose.

The extension shown in FIG. 2c permits wrench 10 to be same time angle the wrench, as seen in FIGS. 8a, 8b, and 8c. In FIG. 8a, extension 12d can be employed to angle the wrench 90 degrees. In FIGS. 8b and 8c, extensions 12c and 12d can be employed to obtain other angles.

As seen in FIG. 9, the jaw end 12b' can be made as illustrated to provide angling of the jaw end.

Under some circumstances, it may be desirable to employ a single helical worm gear in order to narrow the width of the jaw of the wrench. In FIG. 10 there is illustrated such a wrench 10a with a single helical worm gear 117.

The jaw inserts may also be modified to provide a series of special functions.

Figure 11:
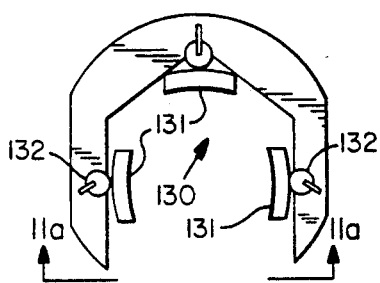
FIG. 11 shows a plan view partially schematic of an alternative jaw insert construction.
Figure 11A:
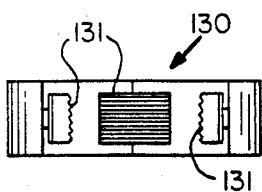
FIG. 11a is an end view of the insert shown in FIG. 11.

For example, in FIGS. 11 and 11a is shown a jaw insert 130 provided with threaders 131 for use in threading pipes. Threaders 131 may be mounted on spring loaded assemblies 132 for insuring that contact is maintained.

Figure 12:
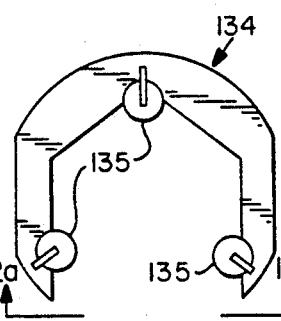
FIG. 12 is a plan view partially schematic of another alternative jaw insert construction.
Figure 12A:
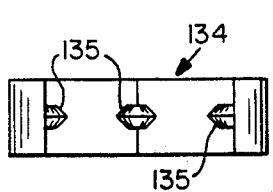
FIG. 12a is an end view of the insert shown in FIG. 12.

In FIGS. 12 and 12a is shown a jaw insert 134 with cutters 135 for use in cutting pipes. Cutters 135 may also be spring biased to maintain contact during the cutting operations.

Figure 13:
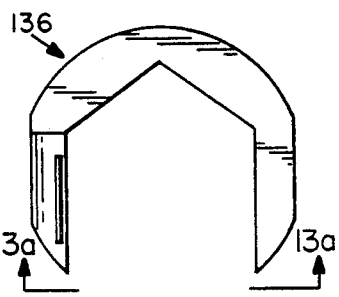
FIG. 13 is a plan view of another alternative jaw insert construction.
Figure 13A:
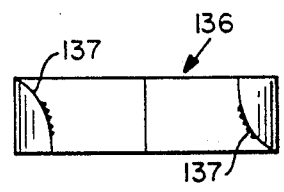
FIG. 13a is an end view of the insert shown in FIG. 13.

In FIGS. 13 and 13a is shown a jaw insert 136 for use in gripping pipes. For this purpose, the inside surface 137 is curved and offset as illustrated, and is provided with a rough surface.

For use in the present invention there may be provided a jaw insert which plugs or fits into the jaw from the top (like regular sockets fit onto a ratchet wrench) rather than slide into the jaw gear from the front as in the earlier described designs. At the same time, the jaw gear may incorporate a number of male members that fit into female members in the insert in order to increase the number of points where the load is divided.

Figure 14:
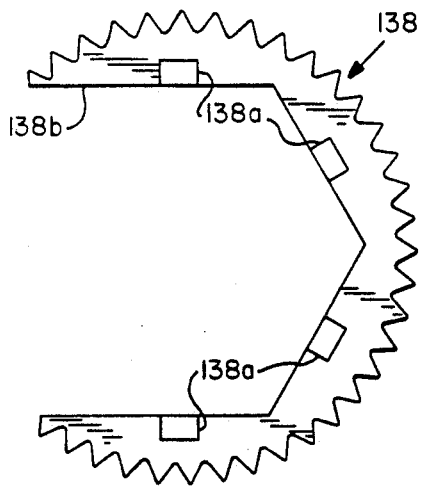
FIG. 14 is a plan view of another alternative jaw construction.

Referring to FIG. 14, jaw 138 is provided with a plurality of upwardly extending teeth 138a adjacent jaw opening 138b.

Figure 15:
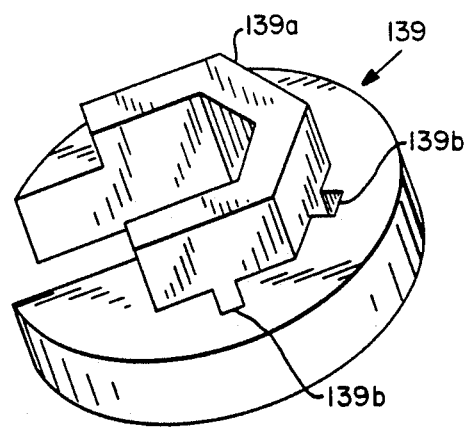
FIG. 15 is an isometric view of an open ended jaw insert which would be used with the jaw shown in FIG. 14.

As seen in FIGS. 15 and 16, jaw insert 139 is provided with a male section 139a which fits down into jaw opening 138b of jaw 138. Teeth 138a enter sockets 139b in jaw insert 139 which increases the size of the load which can be handled. A closed ended insert 140 with male extension 140a and sockets 140b may be used instead of insert 139, as seen in FIG. 17.

This modification allows the user to remove the tool off the insert and out of the area of operation in a situation where the operation of the tool was completed around a pipe (the nut was tightened) while the open ended insert was left in a position where the opening was not in line with the opening of the jaw of the tool as is normally needed to remove the tool and insert off the nut.

It also allows for easier and faster replacement of inserts onto the tool.

It further allows for the opening of the jaw gear to be equal to that of the opening in the housing. This allows the same size tool to operate around larger nuts, and also allows for cleaner storing and handling conditions as when the tool is in the neutral position (the opening of the gear is in line with opening of the housing) the unit will be better sealed as no teeth will be sticking out of the housing which otherwise may collect dirt and then transmit it to the rest of mechanism when the tool is in operation.

A jaw insert incorporating anti-fatigue features is shown in FIGS. 18 and 19.

In FIG. 18, jaw insert 141 is provided with a slit 141a incorporating a spring 141b. With this design, support to the insert against flexing is provided by the housing rather than the jaw itself. This allows for a more durable and lasting operation, and lower costs in the production of the jaw. Spring 141c mounted on the inside of the jaw mouth eliminates the chances of the insert slipping off the tool when the tool is withdrawn off the nut while the insert 141 is in the neutral position (the opening is in line with the opening of the housing) and falling off.

In FIG. 19, jaw insert 142 with slit 142a and spring 142b is provided with a ball 142c mounted on the end of a spring 142d for retaining insert 142 on the nut (not shown) being turned.

Figure 20:
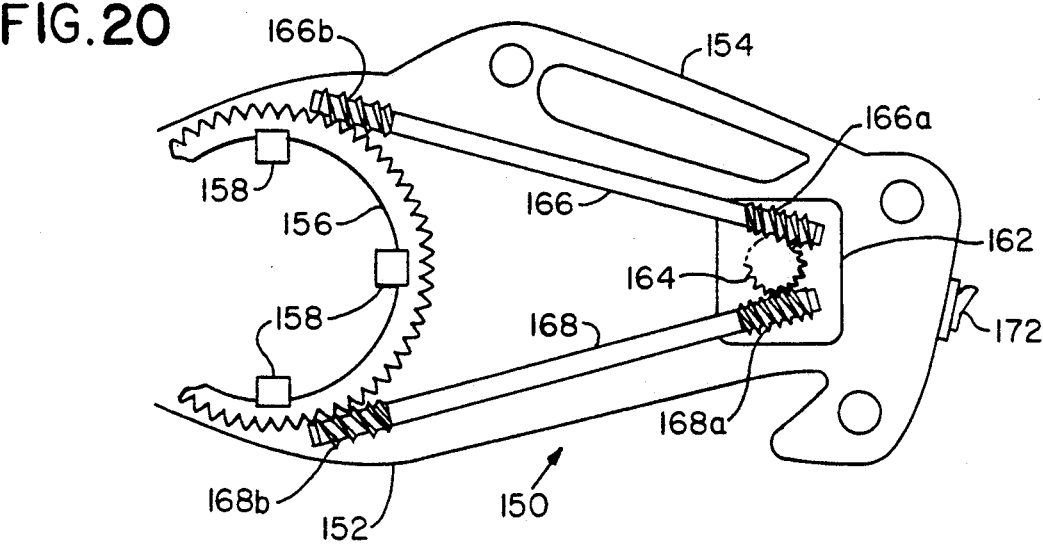
FIG. 20 is a schematic illustration of a hand grinding tool embodying the principles of this invention.

The principles of this invention can be applied to a hand held cutting or grinding tool for use in the field where it is not possible or feasible to take the part to be cut or ground to a machine shape. As seen in FIG. 20, tool 150 is composed of a housing 152 with a hand grip 154 containing a toothed jaw 156 in which is embedded a cutting elements 158. Drive for jaw 156 is from a motor 162 by way of a gear 164 driving shafts 166 and 168 on which are mounted worms 166a and 168a at one end to engage gear 164.

At the other ends of shafts 166 and 168 are worm gears 166b and 168b which engage the gear teeth of jaw 156. An on-off switch 172 controls the operation of tool 150.

Figure 21:
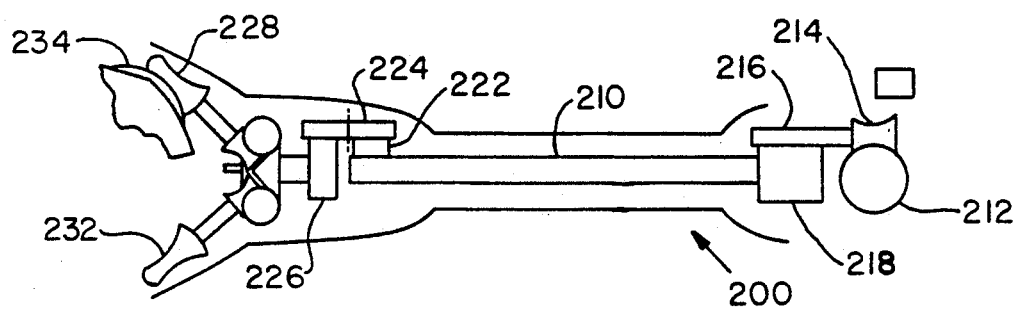
FIG. 21 is a schematic illustration of a wrench with a modified structure.

A variety of multiplier connections are possible with this invention. As seen in FIG. 21, wrench 200 shows a drive shaft 210 with input from gear 212-, helical- gear 214 connected to a worm 216 which engages a worm gear 218. The latter drives shaft 210. Through an assembly of worms and gears 222, 224 and 226, shaft 210 is able to drive helical gears 228 and 232 which engages jaw 234 providing additional torque multiplication. This is a very compact arrangement which permits much higher torque ratios heretofore found possible.

In the arrangements just described, it is possible to deliver high torques using a smaller, and more lightweight and compact wrench than has been possible up to now. Such a wrench is also much cheaper to construct and is less likely to fail due to the high torques developed at the distal end of the wrench.

While only certain preferred embodiments of this invention have been described, it is understood that many variation of the invention are possible without departing from the principles of the invention as defined in the claims which follow.

What is claimed is:

1. A torque multiplying wrench comprising:
   a. an elongated housing;
   b. toothed jaw means adjacent the distal end of said housing exposed for engaging a member to be driven;
   c. input drive means adjacent the proximate end of said housing for receiving an input driving force;
   d. torque means for multiplying and delivering the torque received by said input drive means to said toothed jaw means; and
   e. said torque means including rotatable shaft means extending the length of said housing, gear means at the proximate end of said wrench for transferring torque from said input drive means to one end of said shaft means, and gear means at the distal end of said wrench transferring the torque from said shaft means to said jaw means;
   f. said gear means at the distal end of said wrench comprising a bevel gear mounted on the distal end of said shaft means, bevel gear means mounted for engagement with said bevel gear, and at least one output torque delivering shaft means engaged at one end with said bevel gear means, said output torque delivering shaft means extending to one side of said jaw means and terminating in helical gear means for engaging the teeth on said jaw means.

2. The wrench of claim 1 wherein said output torque delivering shaft means comprises a pair of shafts extending to opposite sides of said jaw means each terminating in said helical gear means.

3. The wrench of claim 2 wherein each said helical gear means comprises a helical gear having a concave profile with the tooth at the end closest to said jaw means being smaller in diameter than the end tooth at the opposite end of said gear.

4. The wrench of claim 3 wherein the end teeth in each said helical gear are thicker than the remaining teeth in said helical gears.

5. The wrench of claim 1 wherein said housing and said rotatable shaft means are split to permit extensions to be inserted thereby to extend the length of said wrench.

6. The wrench of claim 1 wherein said toothed jaw means comprises an open jaw and a jaw insert, (said open jaw) having an opening in which segments are embedded and protrude into said opening, said insert fitting into said opening and having cavities to receive said fittings, to increase the torque strength of said jaw.

7. The wrench of claim 6 in which said jaw includes pivoted hook means and said insert includes means to engage ) said pivoted hook means to prevent said insert means from falling out of said opening.

8. The wrench of claim 1 including a socket to engage said jaw means, said socket being split to permit said socket to be placed over a bolt or pipe inaccessible at the ends thereof.

9. The wrench of claim 1 in which each end of said additional torque multiplying means including a worm.

10. The wrench of claim 1 wherein said toothed jaw means adjacent said distal end of said wrench is replaceable.

11. The wrench of claim 1 having insert means for said toothed jaw means for threading a pipe, said insert means comprising a jaw opening with a plurality of threaders cutters mounted therein.

12. The wrench of claim 1 having insert means for cutting a pipe.

13. The wrench of claim 1 having insert mean for gripping a pipe, said insert means comprising a rough surface which is curved in cross section and offset from top to bottom.

14. The wrench of claim 1 having jaw insert means containing biasing means for retaining contact with the bolt or nut to which it is engaged.

15. The wrench of claim 1 in which said toothed jaw means includes a jaw and is provided with extended male members and jaw insert means with a male member to engage said jaw of said toothed jaw means and sockets for receiving said male members.

16. The wrench of claim 1 having jaw insert means with spring loaded anti-fatigue/windup means.

* * * * *